H. SCHUT.
TRACTION WHEEL.
APPLICATION FILED MAR. 30, 1917. RENEWED JAN. 14, 1919.

1,297,259.

Patented Mar. 11, 1919.

2 SHEETS—SHEET 1.

WITNESSES

INVENTOR
Herman Schut,
BY
ATTORNEY

H. SCHUT.
TRACTION WHEEL.
APPLICATION FILED MAR. 30, 1917. RENEWED JAN. 14, 1919.
1,297,259.
Patented Mar. 11, 1919.
2 SHEETS—SHEET 2.
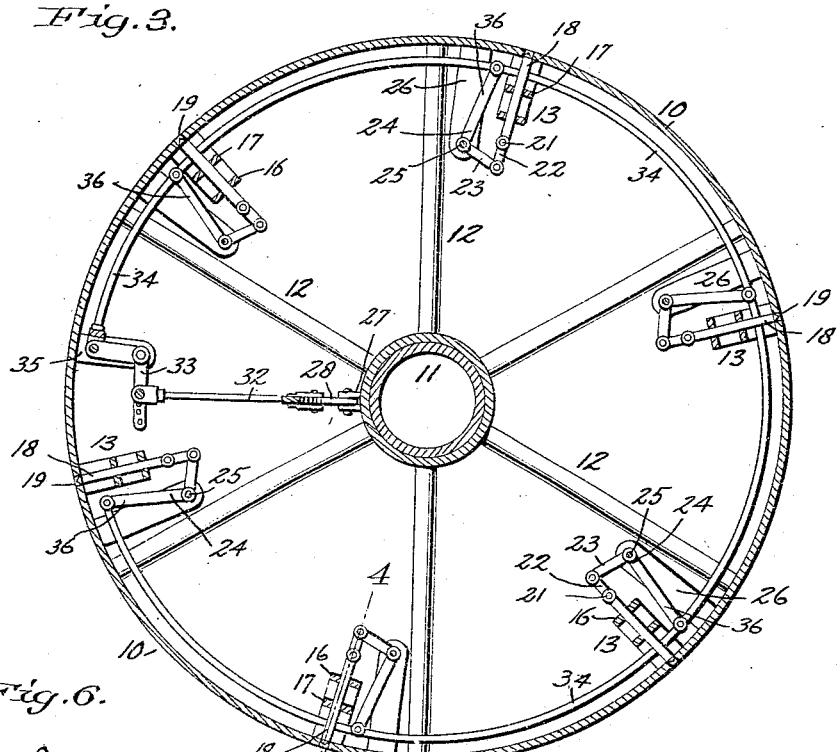
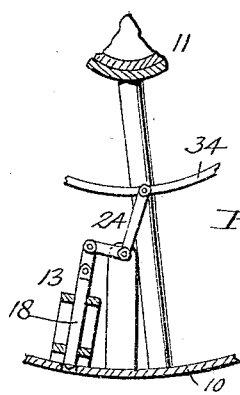
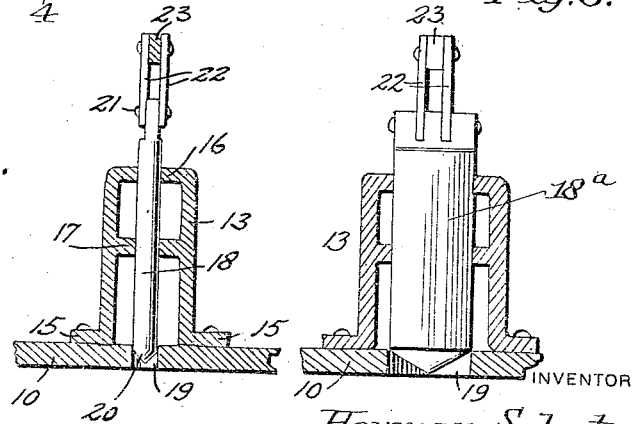
WITNESSES
G. Hennesy,
S. P. Hollingsworth
INVENTOR
Herman Schut,
BY Richard Bowen,
ATTORNEY

UNITED STATES PATENT OFFICE.

HERMAN SCHUT, OF BRANDT, SOUTH DAKOTA.

TRACTION-WHEEL.

1,297,259.  Specification of Letters Patent.  Patented Mar. 11, 1919.

Application filed March 30, 1917, Serial No. 158,660.  Renewed January 14, 1919.  Serial No. 271,160.

*To all whom it may concern:*

Be it known that I, HERMAN SCHUT, a citizen of the United States, residing at Brandt, in the county of Deuel and State of South Dakota, have invented certain new and useful Improvements in Traction-Wheels, of which the following is a specification.

This invention relates to an improvement in wheels for traction vehicles, and has for its object to provide a wheel having a normally smooth outer surface for traveling over the ordinary hard roads, but provided with means within the rim of the wheel for projecting spurs outwardly through said rim when the vehicle is running on soft and slippery roads.

Another object of the invention is to provide a wheel for traction vehicles with spurs mounted upon the inside of the wheel, and means adjacent the hub of said wheel for causing all of said spurs to be simultaneously projected through the rim into position for engaging the ground over which the wheel travels.

A further object of the invention is to provide means adapted to be attached to the interior of any traction wheel and operated by means of a lever for projecting spurs outwardly through the rim of such wheel to engage the ground, increase the traction of the vehicle and prevent slipping of the wheel on smooth, soft, and slippery roads.

With the above as the principal objects in view, the invention consists in the novel construction, combination, and arrangement of parts hereinafter described, pointed out in the appended claims, and illustrated in the accompanying drawings, in which—

Figure 1:
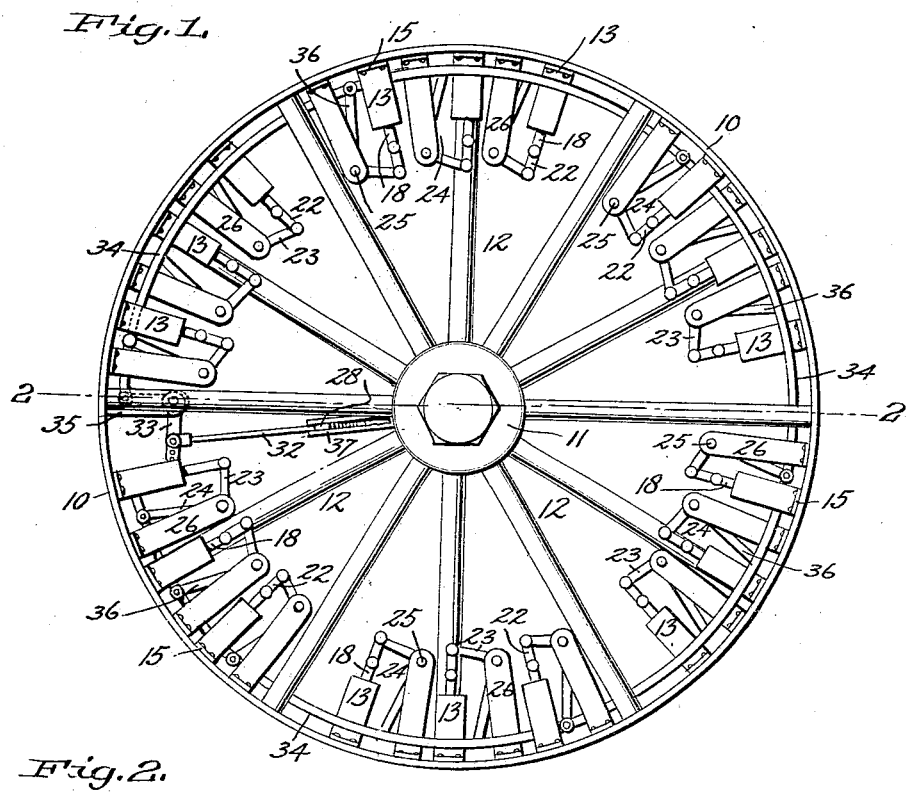
Figure 2:
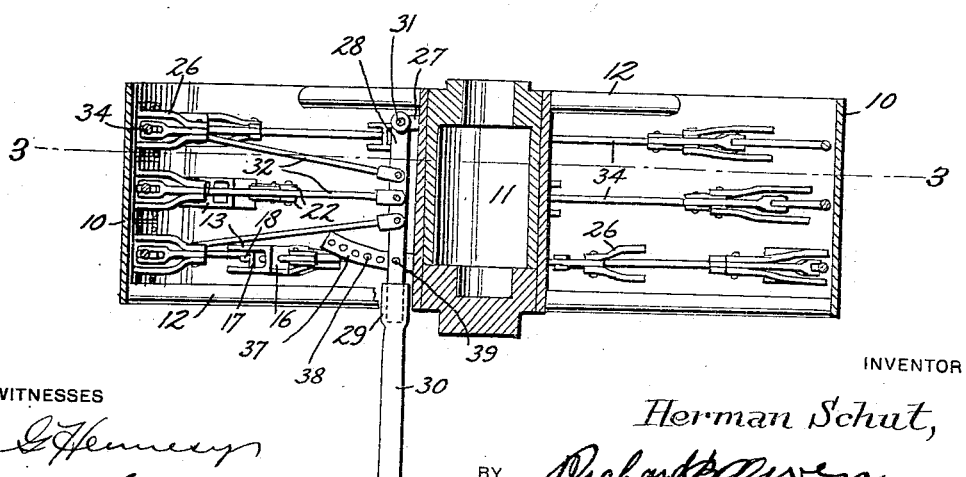

Figure 1 is a side elevation of a traction wheel constructed in accordance with the present invention, Fig. 2 is a horizontal cross sectional view on the line 2—2 of Fig. 1, Fig. 3 is a vertical sectional view on the line 3—3 of Fig. 2, Fig. 4 is a detail sectional view on the line 4—4 of Fig. 3 showing one of the spurs enlarged and the means for supporting the same within the rim of the wheel, Fig. 5 is a similar view of a modified form of spur and Fig. 6 is a detail view of a modified form of the means for moving the spur into and out of action.

In the drawings, 10 indicates the rim of a traction wheel made of flat metal with a broad tread, smooth on its outer surface and mounted upon a hub 11 through the medium of spokes 12. These features being common to traction wheels will not be further described in detail as a traction wheel of almost any type may be provided with the novel features of the present invention.

Bolted against the inner surface of the rim 10 and around the entire circumference are a plurality of U-shaped bearing brackets 13 radially disposed as shown in Fig. 1 and fastened to the rim 10 by bolts or rivets 14 passing through outwardly projecting feet on the bearings 13. The opposite end of each bearing 13 consists of a cross bar 16 between which and the rim 10 is a second cross bar 17, both bars being perforated for a straight pin or spur 18 slidable through said bars and through an opening 19 in the rim 10. The outer end of the spur 18 is preferably pointed, as at 20, to engage the ground when the spur is projected. The opposite end of the spur extends inwardly or toward the axis of the wheel beyond the bearing 13 and is flattened on opposite sides and provided with a transverse perforation to receive a pivot pin 21 for connecting a pair of parallel links 22 to said spur and in turn to one arm 23 of an elbow lever 24 pivoted at 25 in a pair of bracket arms 26 bolted or riveted at the opposite ends to the inner face of the rim 10. Upon rocking the arm 24 on its pivot the spur 18 will be forced outwardly through the opening in the rim and projected beyond the outer surface thereof or drawn back leaving the outer surface of the rim perfectly smooth.

Preferably the bearing brackets 13 are secured to the inner surface of the rim in two or more circular rows, and as shown in Fig. 2, the brackets of each row being offset from those of the other row or rows as shown. In the present instance three of these rows are shown within the rim 10 and by offsetting them the spurs when projected through the rim form a series of transverse diagonal lines across the bearing face thereof and so offer better resistance and provide better traction for the wheel than if disposed in lines parallel to the axis of the wheel.

Projecting radially from the hub 11 on one side is a bearing 27 on which is pivoted a rocking lever 28 that extends to one side of the wheel and normally lies parallel with the hub 11. The free end of the lever 28 projects only a short distance beyond the side of the wheel but is adapted to receive the socketed end 29 of an arm 30 when it is desired to move the lever 28. This arm 30 when not in use may be carried in the tool box attached to the vehicle. Connected to the lever between its pivot 31 and its free end are a number of links 32, the number being equal to the number of circular rows of spurs 18 that are mounted within the wheel rim 10, each link extending from the lever 28 to a bell-crank lever 33, to one arm of which it is pivoted, the other arm of the bell crank lever being in turn pivoted to one end of a flexible bar or wire 34 that extends almost entirely around the interior of the wheel at one side of a row of spurs 18, and preferably between the lugs of the bracket bearings 13. The bell-crank lever 33 is mounted upon the upper ends of two lugs 35 riveted or bolted against the inner surface of the wheel rim 10. Pivotally connected to the circular wire or rod 34 adjacent each bearing 13 through which it passes is the lower end of the arm 36 of each bell crank lever 24, the other arm of which, it will be remembered, is connected by links 22 to a spur 18. Constructed as described movement of the lever 28 away from the hub will push the links 32 toward the rim 10 of the wheel and through their connection to the bell-crank levers 33 the rods or wires 34 will be given a rotary movement about the axis of the wheel and cause the bell-crank levers 36 connected thereto to rock on their pivots 25 and draw inwardly the spurs 18 leaving the outer surface of the rim perfectly smooth. To maintain the lever 28 in this position a locking plate 37 is bolted to the hub 11 adjacent the free end of said lever, and is provided with a plurality of perforations 38 therein to receive a locking pin 39 which may be passed through an opening in the lever 28 and in any one of the series of openings 38 to hold the lever in a desired position. When the spurs are to be projected through the openings 19 in the rim, the lever 28 is swung toward the hub and the parts previously described move in a reverse direction thereby forcing the spurs outwardly through the openings 19 and to a greater or lesser distance beyond the surface of the rim, depending on the extent of movement of the lever 28. Preferably the arms of the several crank levers 33 to which the links 32 are attached are provided with two or more perforations 40 at different distances from the axes of said levers for the purpose of increasing or decreasing the projection of the spurs 18.

A traction wheel such as above described is possessed of many advantages, among which may be noted the fact that the wheel has a perfectly smooth surface, and under ordinary conditions, will permit of faster traveling without damaging the roads; it is not necessary to place boards over bridges or on street crossings when passing over them and the wheels are never clogged with dirt as is common with wheels with exterior lugs; when traveling over muddy, soft or slippery roads, it is only necessary to move the lever a short distance to project the spurs which form a secure hold on the road and will provide sufficient traction to insure uninterrupted movement of the vehicle.

The spurs 18 are shown in the preferred form of the invention as being made of round bar iron or other cylindrical material but may, if desired, be made flat and somewhat broad as shown at 18$^a$ Fig. 5. As a further modification the bell-crank lever 24 may be reversed in position as shown in Fig. 6 and the connecting rod or wire 34 placed between the hub 11 and the bearing bracket instead of near the rim of the wheel as in the preferred construction. This modified arrangement may be found preferable in connection with large traction wheels while the preferred form will be more suitable for small wheels.

What is claimed is:

1. A traction wheel comprising a rim, a circular row of spurs mounted on the inner side of said rim and adapted to be projected outwardly through openings therein, a bell crank lever adjacent each spur and each lever pivoted at one end to a spur, a bearing for each lever fixed on the rim, an annular rod or bar adjacent the row of spurs and within said rim, connections between the free ends of the bell crank levers and said bar and means for moving said bar circumferentially to rock the bell crank levers and project and retract the spurs.

2. A traction wheel comprising a rim, a plurality of circular rows of spurs mounted on the inner side of said rim and adapted to be projected outwardly through openings therein, a rod or bar bent into circular form adjacent each row of spurs and within said rim, a bell crank lever connected to the inner end of each of said spurs and to the adjacent circular rod, a hand lever pivoted to the hub of the wheel and extending outwardly between the spokes thereof, and connections between said hand lever and the circular rods for moving said rods in a circumferential direction to project and retract the spurs.

3. A traction wheel comprising a rim, a circular row of spurs mounted on the inner side of said rim and adapted to be projected outwardly through openings therein, a rod bent into circular form concentrically disposed within said rim and adjacent the row of spurs, a plurality of bell crank levers each connected to one of said spurs and to said circular rod, a hand lever pivoted to the hub and extending outwardly between the spokes of the wheel, a bell crank lever pivoted to said circular rod, and a link connecting said hand lever and the last named bell crank lever for imparting a circumferential movement to said bar or rod and to the bell crank levers to project or retract the spurs.

4. A traction wheel comprising a rim, a circular row of spurs mounted in bearings projecting inwardly from the inner side of said rim and adapted to slide radially in said bearings and be projected outwardly through openings in the rim, a bell crank lever pivotally mounted adjacent each of said spurs, a link connecting one arm of said bell crank lever to the spur, a rod bent into annular form concentrically disposed within said rim and close to the same and pivotally connected to the other arm of each of said bell crank levers, a hand lever pivoted to the hub of the wheel and extending transversely between the spokes thereof, a bell crank lever pivotally connected at one end to said circular rod, and a link connecting the other end of the last named bell crank to said hand lever for moving the annular rod circumferentially when the hand lever is operated to project the spurs outwardly through the rim of the wheel.

In testimony whereof I affix my signature in presence of two witnesses.

HERMAN SCHUT.

Witnesses:
W. F. HALVERSON,
A. O. HALVERSON.

Copies of this patent may be obtained for five cents each, by addressing the "Commissioner of Patents, Washington, D. C."